(12) United States Patent
Malleni et al.

(10) Patent No.: US 11,934,861 B2
(45) Date of Patent: *Mar. 19, 2024

(54) FLOW RULE INSTALLATION LATENCY TESTING IN SOFTWARE DEFINED NETWORKS

(71) Applicant: Red Hat, Inc., Raleigh, NC (US)

(72) Inventors: Sai Sindhur Malleni, Marlborough, MA (US); Venkata Anil Kommaddi, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,662

(22) Filed: Feb. 16, 2023

(65) Prior Publication Data

US 2023/0195501 A1    Jun. 22, 2023

Related U.S. Application Data

(63) Continuation of application No. 17/028,603, filed on Sep. 22, 2020, now Pat. No. 11,620,151.

(51) Int. Cl.
| | |
|---|---|
| G06F 9/455 | (2018.01) |
| G06F 11/36 | (2006.01) |
| H04L 45/586 | (2022.01) |
| H04L 61/5007 | (2022.01) |
| H04L 67/01 | (2022.01) |

(52) U.S. Cl.
CPC ...... *G06F 9/45558* (2013.01); *G06F 11/3612* (2013.01); *H04L 45/586* (2013.01); *H04L 61/5007* (2022.05); *H04L 67/01* (2022.05); *G06F 2009/4557* (2013.01); *G06F 2009/45591* (2013.01); *G06F 2009/45595* (2013.01)

(58) Field of Classification Search
CPC ............. G06F 9/45558; G06F 11/3612; G06F 11/3419; G06F 2009/4557;
(Continued)

(56) References Cited

U.S. PATENT DOCUMENTS 9,276,877 B1    3/2016  Chua et al.
9,887,960 B2 *  2/2018  Chanda ................. H04L 45/586
(Continued)

FOREIGN PATENT DOCUMENTS

| CN | 107005441 A | * | 8/2017 | .......... H04L 43/0811 |
| WO | WO-2013184846 A1 | * | 12/2013 | ............ G06F 11/008 |
| WO | WO-2020043275 A1 | * | 3/2020 | ......... G06F 9/45558 |

OTHER PUBLICATIONS

Cherruea et al.; ENOS: A Holistic Framework for Conducting Scientific Evaluations of OpenStack; Dec. 13, 2016; 17 pages; HAL.

(Continued)

*Primary Examiner* — Alina A Boutah

(57) ABSTRACT

Systems and methods for flow rule installation latency testing in software defined networks. In some examples, a hypervisor may deploy a virtual network switch configured to route data to virtualized computing environments executing on the hypervisor. A client process may be deployed in a first container executing on the hypervisor. A server process may be deployed on the hypervisor. The client process may receive a first request to deploy a virtual machine on the hypervisor. The client process may generate first instructions configured to cause the server process to generate a first namespace. The server process may generate the first namespace and may communicatively couple the first namespace to the virtual network switch.

20 Claims, 6 Drawing Sheets

(58) Field of Classification Search
CPC . G06F 2009/45591; G06F 2009/45595; G06F 8/60; G06F 2201/815; H04L 45/586; H04L 61/5007; H04L 67/01
See application file for complete search history.

(56) References Cited

U.S. PATENT DOCUMENTS

| | | | |
|---|---|---|---|
| 10,560,337 | B2 | 2/2020 | Li et al. |
| 2016/0366233 | A1 | 12/2016 | Le et al. |
| 2017/0060613 | A1* | 3/2017 | Warkentin .......... G06F 9/45545 |
| 2019/0140983 | A1* | 5/2019 | Tu ......................... H04L 69/22 |

OTHER PUBLICATIONS

Thimmaraju et al.; Reins to the Cloud: Compromising Cloud Systems via the Data Plane; Feb. 10, 2017; 14 pages; TU Berlin; Telekom Innovation Laboratories; Aalborg University.
Zhang et al.; Fast Testing Network Data Plane with RuleChecker; 2017 IEEE 25th International Conference on Network Protocols (ICNP); Oct. 10, 2017; 10 pages; Department of Computer Science and Technology; MOE Key Lab for Intelligent Networks and Network Security; Xi'an Jiaotong University.
Bayer et al.; Scale Testing the Red Hat OpenStack Edge with OpenShift; Nov. 15, 2019; 11 pages; Red Hat, Inc.
Venkataanil; Nova_Fake_Driver; readme file cited in prosecution of related U.S. Appl. No. 17/028,603; dated Jul. 8, 2020.

* cited by examiner

FLOW RULE INSTALLATION LATENCY TESTING IN SOFTWARE DEFINED NETWORKS

CROSS-REFERENCE TO RELATED APPLICATIONS

This application is a continuation of and claims priority to U.S. patent application Ser. No. 17/028,603, filed Sep. 22, 2020, now U.S. Pat. No. 11,620,151. The disclosure of the foregoing application is incorporated herein by reference in its entirety.

BACKGROUND

The present disclosure generally relates to testing latency associated with software defined networks (SDNs). SDN technology is an approach to network management that enables dynamic, programmatically efficient network configuration for maintaining a current and consistent state of operation for a network. SDN enables virtual networking in a cloud computing environment. Cloud computing is the act of running compute workloads within distributed computing environments that abstract, pool, and share scalable resources across a computing network. The term "cloud" in the computing context refers to a pool of compute, network, and storage resources within one or more datacenters. These resources may be managed and provisioned through application programming interfaces (APIs) with common authentication mechanisms. Different tenants of a cloud may access the APIs in order to avail themselves of the cloud's resources. Accordingly, each tenant of a cloud computing environment may instantiate their own virtual machines in networks that are dedicated to that tenant (and isolated from other tenants), even though all tenant resources are, in a sense, physically executing on the same underlying hardware.

SUMMARY

The present disclosure provides a new and innovative system, methods and apparatus for flow rule installation latency testing in SDNs. In an example, a hypervisor may deploy a virtual network switch configured to route data to and from virtualized computing environments executing on the hypervisor. In some further examples, a client process may be deployed in a first container executing on the hypervisor. A server process may be deployed on the hypervisor. In various examples, the client process may receive a first request to deploy a first virtual machine on the hypervisor. In response to the first request, the client process may generate first instructions configured to cause the server process to generate a first namespace. The server process may generate the first namespace. In some examples, the server process may communicatively couple the first namespace to the virtual network switch.

In another example, at least one processor is configured in communication with at least one non-transitory computer-readable memory. The at least one processor may be effective to execute a hypervisor. In various examples, the hypervisor may be effective to deploy a virtual network switch configured to route data to and from virtualized computing environments executing on the hypervisor. The hypervisor may be further configured to deploy a client process in a first container executing on the hypervisor. The hypervisor may be further configured to deploy a server process on the hypervisor. The client process may be configured to receive a first request to deploy a first virtual machine on the hypervisor. In response to the first request, the client process may generate first instructions configured to cause the server process to generate a first namespace. The server process may be configured to generate the first namespace in response to the first instructions. In some examples, the server process may communicatively couple the first namespace to the virtual network switch.

In yet another example, a non-transitory machine-readable medium may store a program, that when executed by at least one processor may cause the at least one processor to deploy, by a hypervisor, a virtual network switch configured to route data to and from virtualized computing environments executing on the hypervisor. In various examples, the program, when executed by the at least one processor may further cause the at least one processor to execute first code configured to instantiate a client process in a first container. In another example, the program, when executed by the at least one processor may further cause the at least one processor to execute second code configured to instantiate a server process on the hypervisor. In another example, the program, when executed by the at least one processor may further cause the at least one processor to receive, by the client process, a first request to deploy a first virtual machine on the hypervisor. In still other examples, the program, when executed by the at least one processor may further cause the at least one processor to generate, by the client process in response to the first request, first instructions configured to cause the server process to generate a first namespace. In at least some other examples, the program, when executed by the at least one processor may further cause the at least one processor to generate, by the server process, the first namespace. In yet other examples, the program, when executed by the at least one processor may further cause the at least one processor to communicatively couple the first namespace to the virtual network switch by the server process.

Additional features and advantages of the disclosed method and apparatus are described in, and will be apparent from, the following Detailed Description and the Figures.

DETAILED DESCRIPTION OF EXAMPLE EMBODIMENTS

Figure 1:
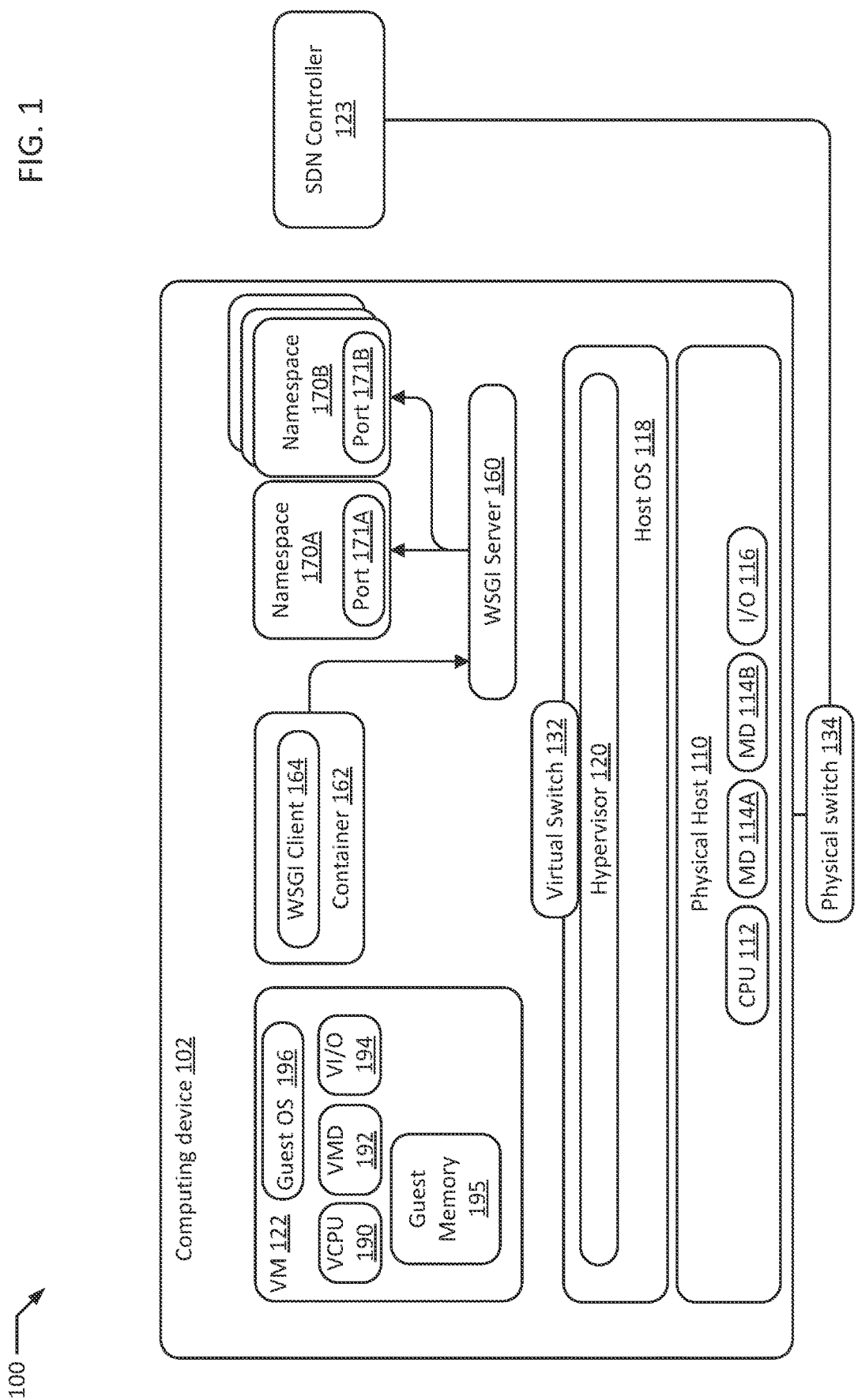
FIG. 1 is a block diagram of a computing device configured in communication with an SDN controller according to an example of the present disclosure.

SDNs enable virtual cloud-based networking and provide dynamic and efficient network configuration to maintain a current and consistent state of the network. There are typically two main components of an SDN: 1) an SDN controller that maintains a holistic view of the network and sends out network configuration instructions; and 2) virtual switches which receive configuration instructions from the SDN controller (e.g., through some protocol such as OpenFlow®) and implement the dataplane which establishes network connectivity.

Testing SDNs at scale is challenging due to the amount of hardware and virtualized systems needed to perform testing. For example, large scale testing may require a large number of virtual machines (VMs) (e.g., hundreds and/or thousands of VMs) to be booted and deployed on many different hypervisors to simulate a realistic workload. However, deploying a large number of virtual machines and/or hypervisors is time consuming and resource intensive. Additionally, the amount of hardware that is set aside for testing purposes is often limited, further limiting the number of virtualized computing environments that can be deployed during testing. Furthermore, programming a virtual switch to enable communication between the various virtual machines (e.g., to establish the dataplane) takes time which can fluctuate depending on the number of virtual machines and/or the workload being deployed on the SDN. In fact, flow rule installation latency, which is the time taken by the SDN controller to program networking flows on the virtual switch (leading to establishment of the dataplane for the deployed virtual machines), is a key performance metric for SDNs. However, for the reasons described above, it is difficult and time consuming to test flow rule installation latency at scale. Flow rule installation tends to increase as the number of VMs deployed increases. For example, flow rule installation latency may vary from 5 seconds to greater than 300 seconds, depending on the number VMs deployed.

In various examples, a fake driver may be used to emulate VM deployments by generating an entry in a database representing a VM and by emulating typical VM messaging workflows. However, the "fake" VMs generated by such a fake driver do not actually boot the VM or connect the VM to the virtual switch. Described herein are flow rule installation latency testing techniques that generate network namespaces (e.g., Linux namespaces) which simulate virtual machine deployments using a modified fake driver architecture. In the modified fake driver architecture described herein, network ports are created inside the namespaces and are connected to the virtual switch (a process referred to as "VIF plugging"). Thereafter, tests can be performed through which the "VM interfaces" are pinged to determine the flow rule installation latency. Note that no actual VM interface is deployed; instead, a port inside the network namespace is used as a simulated VM interface. Accordingly, instead of booting bulky VMs (the number of which may be highly constrained based on the testing environment), network namespaces may be used to emulate the workload VMs and their network functionality (e.g., through creation of ports/network interfaces within the namespaces). Such an approach represents a lightweight, faster approach to flow rule installation latency testing in SDNs relative to booting a large number of VMs and performing VIF plugging.

Note that the virtual switch on the compute nodes to which ports from the namespaces are communicatively coupled (e.g., "plugged") reside on the parent network namespace of the hypervisor. Since the virtual switch resides on the parent network namespace, it can connect to ports from other network namespaces on the parent network namespace. This is because the parent network namespace has access to the other network namespaces deployed on the hypervisor. As such, in order to be communicatively coupled to the virtual switch, the namespaces that mimic VMs should be accessible by the parent network namespace.

In some examples, it may be problematic for the modified fake driver architecture of the compute service (e.g., the compute service deploying the "VMs") to directly generate the network namespaces that mimic VMs. This is because the compute service including the modified fake driver architecture may be running in a container on the hypervisor (in a containerized deployment model). If this is the case, any namespaces generated by the compute service will not be visible to the virtual switch on the parent network namespace. This occurs because each container is deployed in a namespace. Accordingly, any namespaces created within a container are nested namespaces, which are visible to, and accessible by, only the container namespace. In other words, such nested namespaces are not accessible by the virtual switch executing on the hypervisor in the parent namespace.

Accordingly, in various examples described herein, a server process may be deployed on the hypervisor (in the parent namespace). The compute service executing inside a container (with the modified fake driver architecture) acts as a client process and communicates with the server process deployed on the hypervisor. The client process may emulate a driver and may be effective to perform the various operations described herein. When the compute service generates a request to deploy a virtual machine, the modified fake driver architecture generates instructions configured to cause the server process deployed on the hypervisor to create a network namespace (instead of booting a VM). The server process generates a port on the virtual switch and communicatively couples the network namespace to the virtual switch. As the server process is executing on the hypervisor and not inside the compute service container, the resulting network namespaces are accessible to the virtual switch. Accordingly, large numbers of namespaces may be generated to simulate large scale testing of dataplane connectivity/SDN flow install latency even if the compute service is containerized. A ping-like test may be used to ping the ports in the network namespaces to identify the amount of time taken for establishing dataplane connectivity. This flow rule installation latency may be used to quantify SDN performance and identify bottlenecks/delays in SDN flow programming.

FIG. 1 is a block diagram of a system 100 including a computing device 102 configured in communication with an SDN controller 123 according to an example of the present disclosure. Although only a single computing device 102 is depicted in FIG. 1, it may be appreciated that multiple computing devices (sometimes referred to as compute nodes) may be used in accordance with the various techniques described herein. The computing device 102 may include one or more physical host(s), including physical host 110. Physical host 110 may in turn include one or more physical processor(s) (e.g., CPU 112) communicatively coupled to one or more memory device(s) (e.g., MDs 114A-B) and one or more input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device(s) 114A-B refer to volatile or non-volatile memory devices, such as RAM, ROM, EEPROM, or any other device capable of storing data. In an example, memory devices 114A-B may be persistent storage devices such as hard drive disks ("HDD"), solid-state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116 refer to devices capable of providing an interface between one or more processor pins and an external device, the operation of which is based on the processor inputting and/or outputting binary data. In various examples, I/O device(s) 116 may communicate through physical switch 134 with SDN controller 123. Physical switch 134 may be a hardware device used to connect devices and enable communication over a network. SDN controller 123 may be an application acting as a strategic control point of an SDN comprising computing device 102. SDN controller 123 may manage flow control to the physical switch 134 (and/or to other physical switches of other computing devices) to deploy and maintain an SDN. In various examples, SDN controller 123 may use OpenFlow® and/or open virtual switch database (OVSDB) to communicate with physical switch 134.

CPU(s) 112 may be interconnected using a variety of techniques, ranging from a point-to-point processor interconnect, to a system area network, such as an Ethernet-based network. Local connections within physical host 110, including the connections between processors 112 and memory devices 114A-B and between processors 112 and I/O device 116 may be provided by one or more local buses and/or interconnects of suitable architecture, for example, peripheral component interconnect (PCI).

In an example, physical host 110 may run one or more isolated guests, for example, VM 122, which may in turn host additional virtual environments (e.g., VMs and/or containers). In an example, a container (e.g., container 162) may be an isolated guest using any form of operating system level virtualization, for example, OpenShift®, Docker® containers, chroot, Linux®-VServer, FreeBSD® Jails, HP-UX® Containers (SRP), VMware ThinApp®, etc. Container 162 may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given compute service may require the deployment of multiple VMs, containers and/or pods in multiple physical locations. In an example, VM 122 may be a VM executing on physical host 110.

Computing device 102 may run one or more VMs (e.g., including VM 122) and/or other virtualized execution environments, by executing a software layer (e.g., hypervisor 120) above the hardware and below the VM 122, as schematically shown in FIG. 1. The various VMs and/or containers may be configured to communicate with one another and/or with other devices via ports on virtual switch 132. Virtual switch 132 may be executing on hypervisor 120.

In an example, the hypervisor 120 may be a component of respective host operating system 118 executed on physical host 110, for example, implemented as a kernel based virtual machine function of host operating system 118. In another example, the hypervisor 120 may be provided by an application running on host operating system 118. In an example, hypervisor 120 may run directly on physical host 110 without an operating system beneath hypervisor 120 (e.g., in a "bare metal" implementation). Hypervisor 120 may virtualize the physical layer, including processors, memory, and I/O devices, and present this virtualization to VM 122 as devices, including virtual central processing unit ("VCPU") 190, virtual memory devices ("VIVID") 192, virtual input/output ("VI/O") device 194, and/or guest memory 195. In an example, another virtual guest (e.g., a VM or container) may execute directly on host OSs 118 without an intervening layer of virtualization.

In an example, a VM 122 may be a virtual machine and may execute a guest operating system 196, which may utilize the underlying VCPU 190, VIVID 192, and VI/O 194. Processor virtualization may be implemented by the hypervisor 120 scheduling time slots on physical CPUs 112 such that from the guest operating system's perspective those time slots are scheduled on a virtual processor 190. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196 such as guest memory 195 provided to guest OS 196.

In an example, container 162 may execute a compute service, such as a service configured to deploy a workload on compute resources of computing device 102 and/or system 100. In various examples, in order to deploy the workload, the compute service may be effective to generate requests to deploy virtual machines. In some examples, the requests to deploy virtual machines may be received from a cloud management system (e.g., OpenStack®). The requests may include a unique identifier for the VM and a dictionary (key-value pair "network_info" defining various network parameters for the VM such as the media access control (MAC) address, IP address, IP routing information, etc., for each network interface of the VM.

As described in further detail below, in some examples, a client process (e.g., a web server gateway interface (WSGI) client 164) may act as a modified fake driver architecture configured to receive and/or detect requests to deploy VMs generated by the compute service. In response to receipt and/or detection of a request to deploy a VM, the client process (e.g., WSGI client 164) may generate instructions configured to cause a server process (e.g., WSGI server 160) executing on hypervisor 120 to generate a network namespace (e.g., namespaces 170A, 170B) that represents the VM network stack requested by the cloud management system. Since the server process, such as WSGI server 160, is executing on the hypervisor 120 (e.g., in the parent network namespace), network namespaces generated by the server process may be accessible by, and communicatively coupled to, the virtual switch 132. Additionally, the client process (e.g., the modified fake driver architecture of WSGI client 164) may send instructions to the server process (e.g., WSGI server 160) describing a network port to be added to the respective namespaces. WSGI server 160 may parse the instructions to determine the appropriate namespace to which to add the port. In the example depicted in FIG. 1, WSGI server 160 may add port 171A to namespace 170A and port 171B to namespace 171B. In addition, although not shown in FIG. 1, the WSGI server 160 may attach respective internet protocol (IP) addresses to the ports 171A, 171B and may insert IP routing information specified by the instructions received from the modified fake driver architecture of the client process (e.g., WSGI client 164) to communicatively couple the namespaces 170A, 170B to the virtual switch 132. Thereafter, ping-like requests may be sent to the namespaces 170A, 170B via their respective ports 171A, 171B, and the amount of time it takes for the namespaces 170A, 170B to respond may be determined in order to estimate flow rule installation latency.

In an example, any form of suitable network for enabling communications between computing devices (and between VMs/containers and SDN controller 123), for example, a public network (e.g., the Internet), a private network (e.g., a local area network (LAN) or wide area network (WAN)), or a combination thereof, may be employed to connect the component parts of the system to each other.

Figure 2:
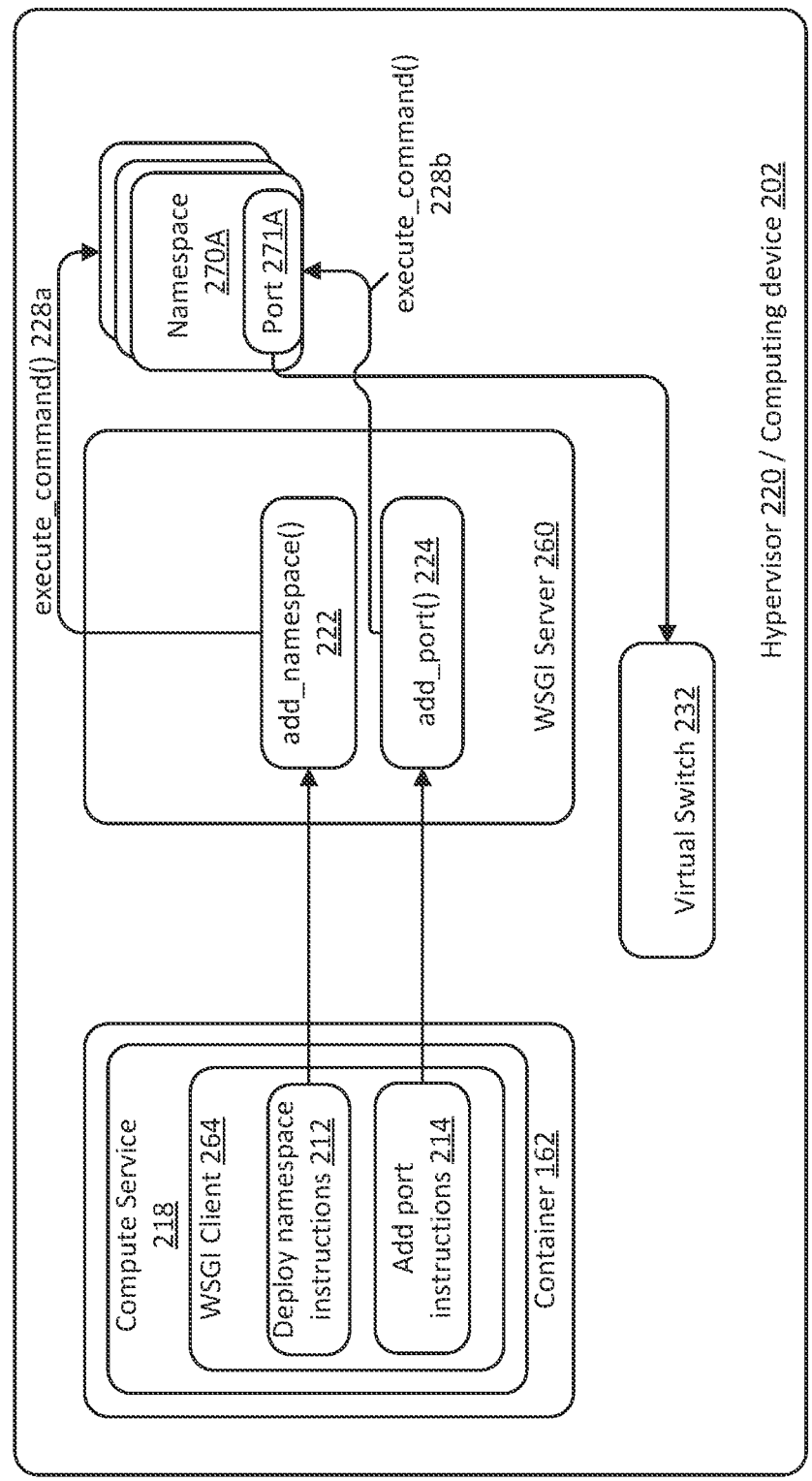
FIG. 2 is a block diagram illustrating deployment of namespaces that may be used for flow rule installation latency testing, according to various aspects of the present disclosure.

FIG. 2 is a block diagram illustrating deployment of namespaces that may be used for flow rule installation latency testing, according to various aspects of the present disclosure. Compute service 218 may be any compute service that may deploy a workload on an underlying physical system (e.g., computing device 102). For example, a cloud management system such as OpenStack® may request deployment of a number of VMs on hypervisor 220. The cloud management system may pass the request to deploy the VMs to compute service 218. Virtual networking information (e.g., IP address, MAC address, IP routing information, etc.) for the VMs may be stored in a database for the requested VMs. The virtual networking information may be passed to the client process (e.g., WSGI client 264) as a dictionary (key-value pair) "network_info." An instance ID (e.g., a UUID) may be generated for each requested VM.

In various examples, compute service 218 may execute within a container 162. However, in other examples, compute service 218 may execute directly on hypervisor 220. A modified fake driver architecture (e.g., a client process such as WSGI client 264) of compute service 218 may detect requests generated by compute service 218 to deploy a VM and may receive the network_info and UUID for each requested VM. In response to detection of a request to deploy a VM, WSGI client 264 may deploy namespace instructions 212 and may send the instructions to WSGI server 260. WSGI server 260 may be a server process executing directly on hypervisor 220 (in the parent network namespace). In various examples, the deploy namespace instructions 212 may be sent to WSGI server 260 as a first JSON message. The first JSON message may comprise the name of the namespace (e.g., "Namespace-<VM UUID>").

WSGI server 260 may receive the first JSON message (or other instructions) and may parse the first JSON message and execute the add_namespace( ) 222 method to create the particular network namespace. Accordingly, the WSGI server 260 may create a network namespace with the requested namespace name using execute commando 228a. In the example depicted in FIG. 2, WSGI server 260 creates namespace 270A using the add_namespace( ) 222 instruction in response to the first JSON message.

WSGI client 264 may also send add port instructions 214 (e.g., port request data) as a second JSON message. The add port instructions 214 may include the name of the namespace (e.g., the UUID) along with the IP address and MAC address for each interface in the fake VM. This information is stored in the dictionary (key-value pair) "network_info" received by the WSGI client 264. The network_info may also include IP routing information (describing how network traffic should be routed by the particular interface of the namespace).

WSGI server 260 may receive the second JSON message and may parse the second JSON message. WSGI server 260 may execute the add_port( ) 224 method. The add_port( ) 224 method may receive from the WSGI client 264, the namespace name and device details (e.g., IP address, MAC, etc.). The add_port( ) 24 method may create the port 271A in the named namespace (e.g., namespace 270A) with the MAC address/IP info received in the second JSON (e.g., via execute commando 228b). The namespace 270A may be added to the virtual switch 232 executing on the hypervisor 220.

Since the WSGI server 260 is executing in the parent namespace on the hypervisor, namespaces (such as namespace 270A) created by the WSGI server 260 are accessible by the virtual switch 232 which is also executing on the hypervisor 220 in the parent namespace. Once the namespace 270A is communicatively coupled to the virtual switch 232 via port 271A, the namespace 270A may be pinged to determine a response time. These operations may be replicated for each namespace (e.g., for each "fake" VM) generated using the above-described techniques. Accordingly, the above-described techniques may be used to estimate flow rule installation latency for a given workload (e.g., requiring deployment of a particular number of VMs) without booting any VMs.

In various examples, the following pseudocode (or functionally equivalent code) may be used to implement the modified fake driver architecture (e.g., the WSGI client 264):

```
def plug_vif (self, instance, vif):
    dev = vif.get("devname")
    port = vif.get("id")
    mac_address = vif.get("address")
    if not dev or not port or not mac_address:
        return
    ns = "fake-%s" % instance.uuid
    command = {"add_port": {"namespace": ns, "vif": vif}}
    LOG.info("fake-vif: Add port %s" % command)
    send_command(command)
```

In various examples, the above code may execute inside container 162 executing compute service 218 and may generate the deploy namespace instructions 212 for creating a new network namespace instead of a VM. Additionally, the above code may generate the add port instructions 214 to add the port to the namespace and connect the port to the virtual switch 232. The modified fake driver (e.g., WSGI client 264) may send commands to WSGI server 260 (e.g., a server process executing on hypervisor 220) using the following pseudocode (or functionally equivalent code):

```
def send_command(command):
    # Note that the message is sent via a Unix domain socket so that
    # the URL does not matter.
    resp, content = httplib2.Http( ).request(
        'http://127.0.0.1/',
        method="POST",
        headers={'Content-Type': 'application/json'},
        body=json.dumps(command),
```

-continued

```
    connection_type=FakeNovaDriverClientConnection)
if resp.status != 200:
    raise Exception('Unexpected response %s' % resp)
```

The above command is not executed inside the container 162 and instead is sent to the WSGI server 260 listening on the Unix socket on the hypervisor 220.

In various examples, the following pseudocode (or functionally equivalent code) may be used by the WSGI server 260 to create a new network namespace mimicking the requested VM:

```
def add_namespace(ns):
    full_args = ["sudo", "ip", "netns", "add", ns]
    execute_command(full_args)
    full_args = ["sudo", "ip", "netns", "exec", ns,
        "ip", "link", "set", "lo", "up"]
    execute_command(full_args)
```

In various examples, the following pseudocode (or functionally equivalent code) may be used by the WSGI server 260 to add a port to the network namespace mimicking the requested VM. Additionally, default network routes, etc., are added to the newly created network namespace:

```
def add_port(ns, bridge, ovs_port, port_id,
        mac_address, ip_addresses, gateway, mtu):
    namespace = ["sudo", "ip", "netns", "exec", ns]
    cmd = ["sudo", "ovs-vsctl", "--may-exist",
        "add-port", bridge, ovs_port.
        "--", "set", "Interface", ovs_port.
        "type=internal",
        "--", "set", "Interface", ovs_port.
        "external_ids:iface-id=%s" % port_id,
        "--", "set", "Interface", ovs_port.
        "external-ids:iface-status=active",
        "--", "set", "Interface", ovs_port,
        "external-ids:attached-mac=%s" % mac_address]
    executecommand(cmd)
    cmd = ["sudo", "ip", "link", "set", ovs_port, "netns", ns]
    execute_command(cmd)
    cmd = namespace + ["ip", "link", "set", ovs_port, "up"]
    execute_command(cmd)
    cmd = namespace + ["ip", "link", "set", ovs_port, "address"
        mac_address]
    execute_command(cmd)
    for address in ip_addresses :
        cmd = ["sudo", "ip", "netns", "exec", ns,
            "ip", "addr", "add", address, "dev", ovs_port]
        execute_command(cmd)
    cmd = namespace + ["ip", "route", "add", "default"]
    cmd = cmd + ["via", gateway, "dev", ovs_port]
    execute_command(cmd)
```

In various examples, a cleanup process used to deprovision the network namespaces may be used. For example, a cloud management system may send a request to deprovision a particular VM. The request may include the UUID of the particular VM as well as "network_info" for the particular VM. The WSGI client 264 may generate an instruction to delete the port. The instruction may be sent to the WSGI server 260 (e.g., as a JSON message). The WSGI server 260 may perform a method (e.g., a delete_port( ) method) to delete the port corresponding to the particular network namespace. In various examples, the appropriate network namespace may be identified based on the UUID and the port may be identified based on the MAC. Accordingly, the port may be deleted from the virtual switch 232. Additionally, the WSGI client 264 may generate an instruction to delete the namespace corresponding to the UUID. The instruction may be sent to the WSGI server 260 (e.g., as a JSON message). The WSGI server 260 may, in turn, delete the appropriate network namespace (e.g., using a delete_namespace( ) method).

Figure 3:
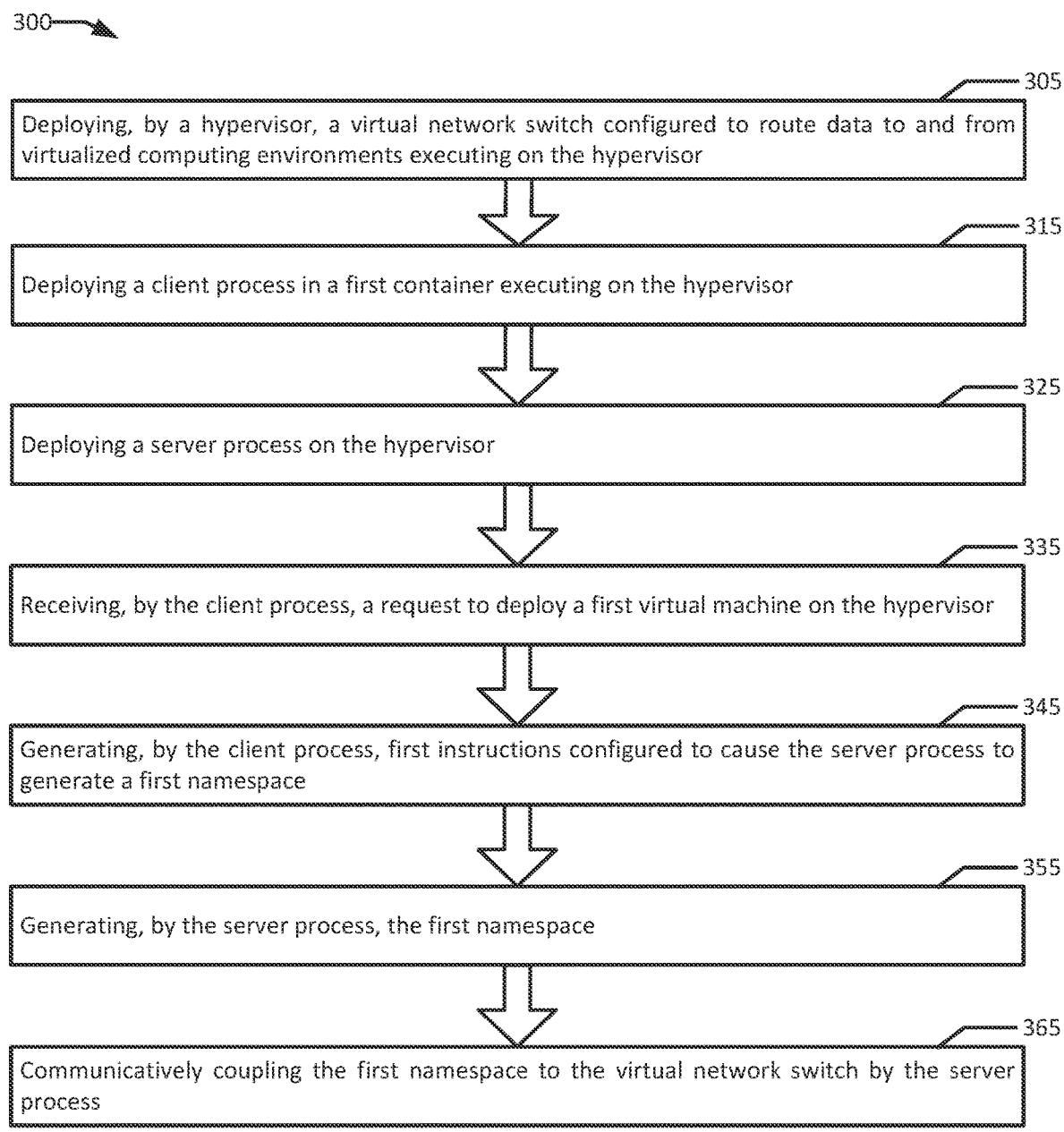
FIG. 3 is flowchart illustrating an example process for flow rule installation latency testing according to an example of the present disclosure.

FIG. 3 is flowchart illustrating an example process 300 for flow rule installation latency testing according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes deploying, by a hypervisor, a virtual network switch configured to route data to and from virtualized computing environments executing on the hypervisor (block 305). For example, virtual network switch 232 may be deployed on the hypervisor 220. The virtual network switch 232 may be effective to route data to and from various virtual machines and/or other virtualized execution environments executing on the SDN.

In an example, the process 300 may include deploying a client process in a first container executing on the hypervisor (block 315). For example, the WSGI client 264 may be deployed in a container executing on the hypervisor 220. In an example, the process 300 may include deploying a server process on the hypervisor (block 325). For example, WSGI server 260 may be executed by hypervisor 220. As previously described, the WSGI server 260 may execute on the hypervisor 220. Accordingly, namespaces generated by the WSGI server 260 may be accessible by a virtual switch (e.g., virtual switch 232) executing on the hypervisor 220.

Process 300 may include receiving, by the client process, a request to deploy a first virtual machine on the hypervisor (block 335). For example, the WSGI client 264 (e.g., a modified fake driver) may receive a request to deploy a first virtual machine from a cloud management system. Additionally, in some examples, the WSGI client 264 may receive a dictionary (key-value pair) "network_info" for the first virtual machine that specifies a UUID for the VM, MAC addresses and/or IP addresses for each network interface of the VM, etc. Process 300 may include generating, by the client process, first instructions configured to cause the server process to generate a first namespace (block 345). For example, WSGI client 264 may generate a first JSON message effective to cause the WSGI server 260 to execute the add_namespace( ) 222 method. The first instructions may specify a name of the namespace (e.g., the UUID of the requested VM), MAC address(es), IP addresses, routing information, etc.

In various examples, process 300 may include generating, by the server process, the first namespace (block 355). For example, the WSGI server 260 may execute the add_namespace( ) 222 method to generate a network namespace with the requested name (e.g., the UUID of the requested VM). The newly-generated network namespace (e.g., namespace 270A) may include the name (UUID) specified in the first instructions received from the WSGI client 264 (e.g., in the first JSON message). In various examples, process 300 may include communicatively coupling the first namespace to the virtual network switch by the server process (block 365). For example, the WSGI server 260 may receive a second JSON message from the WSGI client 264. The second JSON message may include the namespace name (e.g., the UUID), MAC details and IP addresses for each interface in the VM request. The WSGI server 260 may execute the add_port( ) method to create the port on the virtual switch 232 in the namespace. The port includes the MAC and IP address specified by the second JSON message. Accordingly, the namespace (e.g., namespace 270A) may be communicatively coupled to the virtual switch 232 and dataplane connectivity may be established.

Figure 4A:
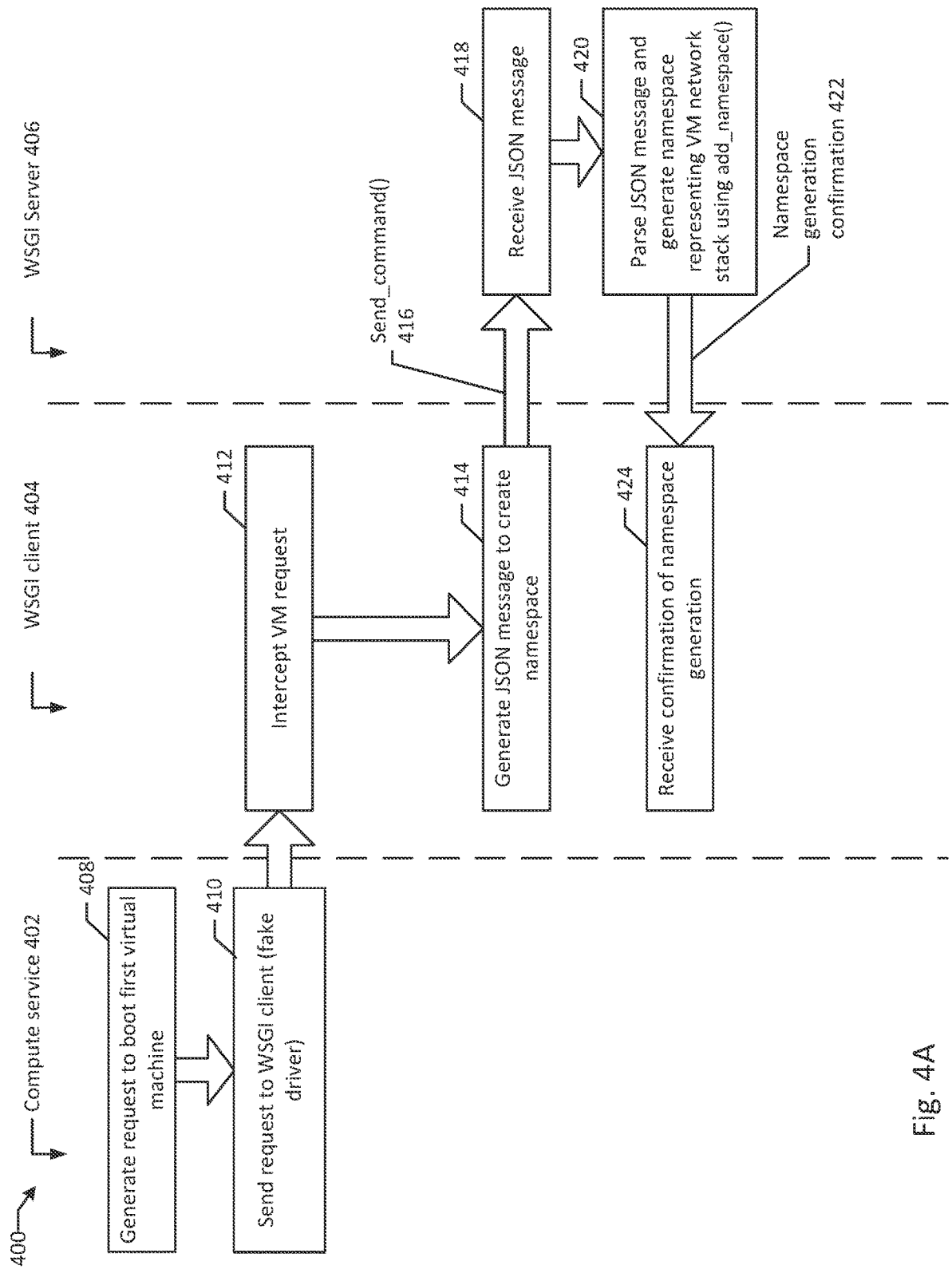
FIGS. 4A and 4B illustrate a flow diagram of an example of a flow rule installation latency test according to an example of the present disclosure.
Figure 4B:
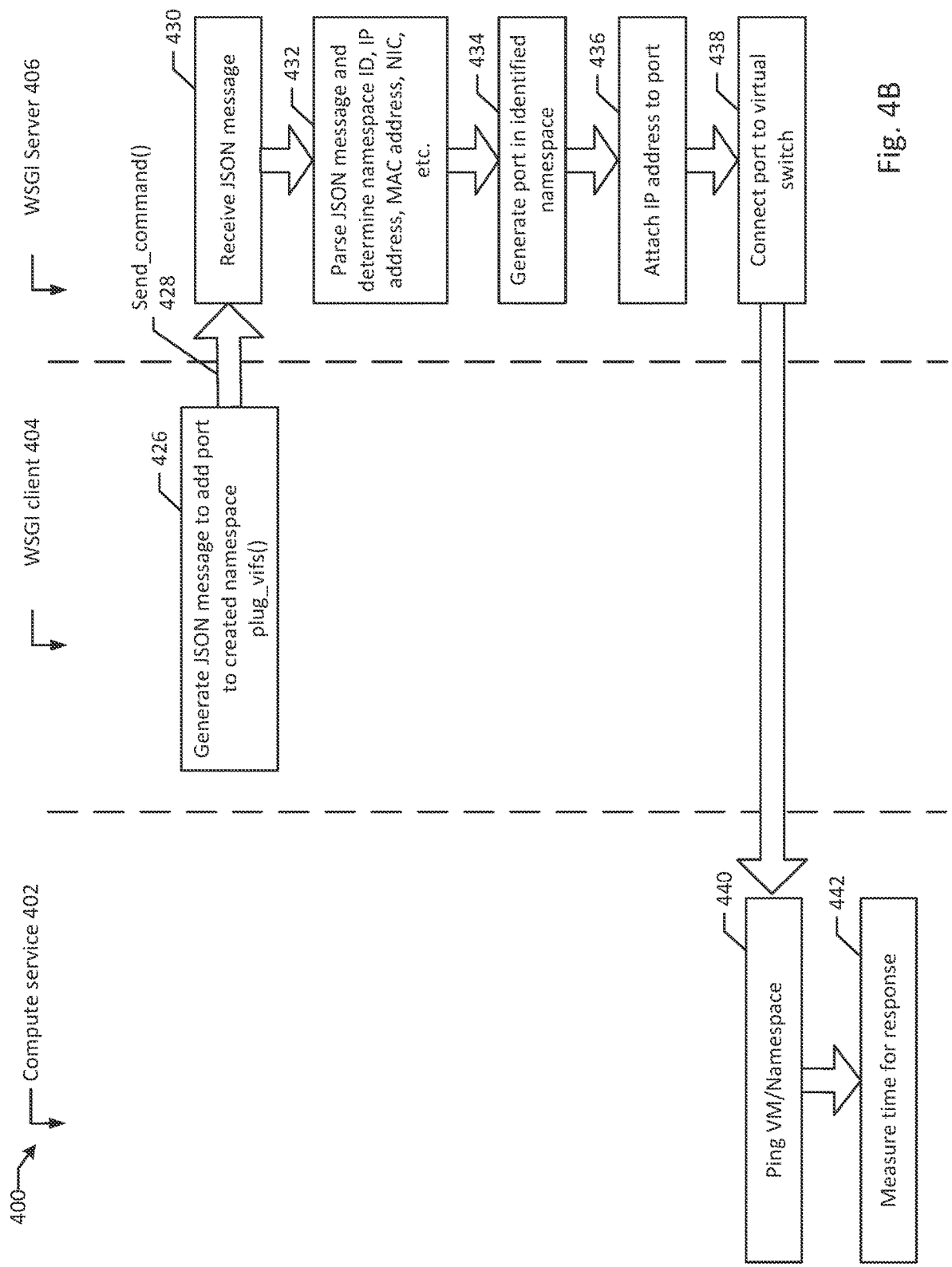

FIGS. 4A and 4B illustrate a flow diagram 400 of an example of a flow rule installation latency test according to an example of the present disclosure. Although the examples below are described with reference to the flow diagram illustrated in FIGS. 4A and 4B, it will be appreciated that many other methods of performing the acts associated with FIGS. 4A and 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In the illustrated example flow diagram 400, compute service 402 generates a request to boot a first virtual machine (block 408). In various examples, the request may be generated by a cloud management system. The request to boot the first virtual machine may be sent to the WSGI client (e.g., the modified fake driver) (block 410). In various examples, the UUID of the first virtual machine and the dictionary (key-value pair) "network_info" for the first virtual machine may be sent to the WSGI client 404. The WSGI client 404 may intercept the VM request (block 412). Instead of booting a VM, WSGI client 404 may generate a JSON message configured to cause WSGI server 406 to generate a namespace emulating the requested VM network stack (block 414). The first JSON message may comprise the name of the namespace to be generated by the WSGI server 406.

The send commando 416 may be used to send the first JSON message to the WSGI server 406. The WSGI server 406 may receive the first JSON message (block 418). The WSGI server 406 may parse the first JSON message and may generate a namespace representing the requested VM network stack using the add_namespace( ) method (block 420). The generated namespace may have the name (e.g., a UUID) specified in the first JSON message received from WSGI client 404. In various examples, WSGI server 406 may send a namespace generation confirmation message 422 to the WSGI client 404 to indicate that the requested network namespace has been created. WSGI client 404 may receive confirmation of namespace generation (block 424).

As illustrated in FIG. 4B, the WSGI client 404 generates a second JSON message to add a port to the created namespace using the plug vifs( ) method (block 426). The second JSON message may include add port instructions that may include the name of the network namespace, the IP address and MAC address for each interface of the VM that is represented by the network namespace, and routing information for the port. WSGI client 404 may send the second JSON message to WSGI server using the Send commando 428. The WSGI server 406 may receive the second JSON message (block 430). The WSGI server 406 may parse the second JSON message to determine the namespace ID (e.g., the namespace name—UUID), the IP address(es) and MAC address(es), the network interface controller (NIC), IP routing information, etc. (block 432). The WSGI server 406 may generate the port in the identified namespace (block 434). The WSGI server 406 may attach the IP address and/or MAC address for the port and may provide the IP routing information for the port to the virtual switch (block 436). The WSGI server 406 may connect the port to the virtual switch (block 438). For example, the WSGI server 406 may execute the add_port( ) method to create the port in the named namespace (e.g., the namespace named in the second JSON message) with the MAC address/IP info received in the second JSON. The named namespace may be added to the virtual switch executing on the hypervisor.

The compute service 402, or some other component, may ping the VM (e.g., the namespace emulating the VM) (block 440). The compute service 402, or other component, may measure the time for response (block 442). Accordingly, the flow rule installation latency may be estimated.

Figure 5:
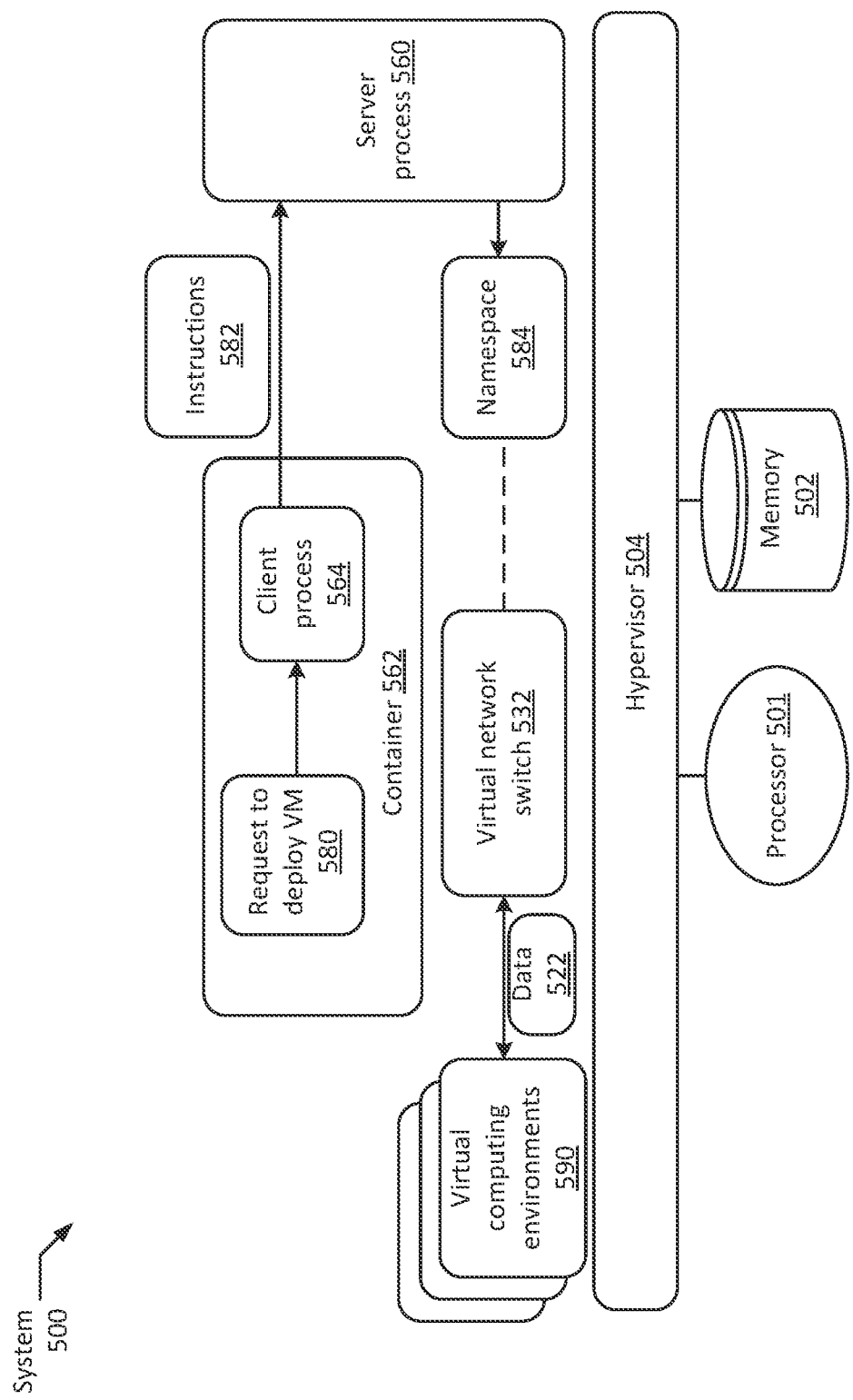
FIG. 5 is a block diagram of a system configured to perform flow rule installation latency testing, according to an example of the present disclosure.

FIG. 5 is a block diagram of a system 500 configured to perform flow rule installation latency testing, according to an example of the present disclosure. The system 500 may include at least one processor 501 executing a hypervisor 504. The system 500 may further include a memory 502 (e.g., a non-transitory computer-readable memory). In some examples, the memory 502 may store instructions that, when executed, may cause processor 501 to perform one or more of the various techniques described herein (e.g., in reference to FIGS. 1-4B). The hypervisor 504 may be configured to deploy a virtual network switch 532 that may route data 522 to and from virtualized computing environments 590. Virtualized computing environments 590 may be, for example, VMs and/or containers that may be executed on hypervisor 504 and/or on some other compute node.

Hypervisor 504 may be configured to deploy a client process 564 executing in a container 562. The client process 564 may be a modified fake driver (e.g., a WSGI client) that may receive requests to deploy VMs 580 on hypervisor 504. In some examples, the request may be received from a cloud management system. The client process 564 may generate instructions 582 in response to the request to deploy VM 580. The instructions 582 may be configured to cause a server process 560 that is deployed on the hypervisor 504 to generate namespace 584. Additionally, the instructions 582 (or separate instructions) may be effective to communicatively couple the namespace 584 to the virtual network switch 532 (e.g., performing virtual interface plugging).

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method, comprising:
deploying, by a hypervisor, a virtual network switch configured to route data to and from virtualized computing environments executing on the hypervisor;
receiving a first request to deploy a first virtual machine on the hypervisor;
generating, in response to the first request, first instructions configured to generate a first namespace;
generating the first namespace; and
communicatively coupling the first namespace to the virtual network switch.

2. The method of claim 1, further comprising:
receiving port request data comprising instructions to generate a first port in the first namespace; and
generating the first port in the first namespace.

3. The method of claim 2, further comprising:
parsing the port request data to determine an internet protocol (IP) address and IP routing information specified by the port request data; and
connecting the IP address to the first port in the first namespace.

4. The method of claim 1, further comprising:
sending, by a testing system, a request to the first namespace via the virtual network switch;
receiving, by the testing system, a response to the request from the first namespace; and
determining an amount of time elapsed between the sending of the request and the receiving of the response.

5. The method of claim 1, further comprising:
receiving a plurality of second requests, wherein each of the plurality of second requests is a request to deploy a respective virtual machine;
deploying, in response to the plurality of second requests, a plurality of namespaces; and
communicatively coupling each of the plurality of namespaces to the virtual network switch.

6. The method of claim 5, further comprising:
determining an amount of time between generation of the plurality of namespaces and establishing network connectivity with the plurality of namespaces via the virtual network switch.

7. The method of claim 1, further comprising:
receiving a second request to deprovision the first virtual machine;
generating, in response to the second request, second instructions configured to delete the first namespace; and
deleting the first namespace in response to the second instructions.

8. The method of claim 1, further comprising:
receiving second instructions specifying the first namespace, a media access control (MAC) address, an internet protocol (IP) address, and IP routing information;
generating a first port in the first namespace with the MAC address; and
connecting the first port to the IP address.

9. The method of claim 1, wherein a client process emulates a driver that intercepts virtual machine instantiation requests and generates instructions configured to cause a server process to deploy namespaces on the hypervisor.

10. A system, comprising:
at least one processor; and
at least one non-transitory computer-readable memory configured in communication with the at least one processor, wherein the at least one processor is effective to execute a hypervisor;
the hypervisor configured to:
deploy a virtual network switch configured to route data to and from virtualized computing environments executing on the hypervisor;
receive a first request to deploy a first virtual machine on the hypervisor; and
generate, in response to the first request, first instructions configured to generate a first namespace;
generate the first namespace in response to the first instructions; and
communicatively couple the first namespace to the virtual network switch.

11. The system of claim 10, wherein the hypervisor is further configured to:
receive port request data comprising instructions to generate a first port in the first namespace; and
generate the first port in the first namespace.

12. The system of claim 11, wherein the hypervisor is further configured to:
parse the port request data to determine an internet protocol (IP) address and IP routing information specified by the port request data; and
connect the IP address to the first port in the first namespace.

13. The system of claim 10, further comprising a testing system, wherein the testing system is configured to:
send a request to the first namespace via the virtual network switch;
receive a response to the request from the first namespace; and
determine an amount of time elapsed between sending the request and receiving the response.

14. The system of claim 10, wherein the hypervisor is further configured to:
receive a plurality of second requests, wherein each of the plurality of second requests is a request to deploy a respective virtual machine;
in response to the plurality of second requests, deploy a plurality of namespaces; and
communicatively couple each of the plurality of namespaces to the virtual network switch.

15. The system of claim 14, wherein the at least one processor is further configured to determine an amount of time between instantiation of the plurality of namespaces and establishing network connectivity with the plurality of namespaces via the virtual network switch.

16. The system of claim 10, wherein the at least one processor is configured to execute a first compute service within the first container, wherein the first request to deploy the first virtual machine on the hypervisor is received from the first compute service.

17. The system of claim 10, wherein the hypervisor is further configured to:
receive second instructions specifying the first namespace, a media access control (MAC) address, an internet protocol (IP) address, and IP routing information;
generate a first port in the first namespace with the MAC address; and
connect the first port to the IP address.

18. The system of claim 10, wherein a client process emulates a driver that intercepts virtual machine instantiation requests and generates instructions configured to cause a server process to deploy namespaces on the hypervisor.

19. A non-transitory machine readable medium storing a program, which when executed by at least one processor causes the at least one processor to:
   deploy, by a hypervisor, a virtual network switch configured to route data to and from virtualized computing environments executing on the hypervisor;
   receive a first request to deploy a first virtual machine on the hypervisor;
   generate, in response to the first request, first instructions configured to generate a first namespace;
   generate the first namespace; and
   communicatively couple the first namespace to the virtual network switch.

20. The non-transitory machine readable medium of claim 19, which, when executed by the at least one processor, further causes the at least one processor to:
   receive port request data comprising instructions to generate a first port in the first namespace; and
   generate, by the server process the first port in the first namespace.

* * * * *